July 13, 1926.                 C. N. FAIRCHILD                 1,592,088
                              STEERING POST LOCK
                              Filed Oct. 18, 1923
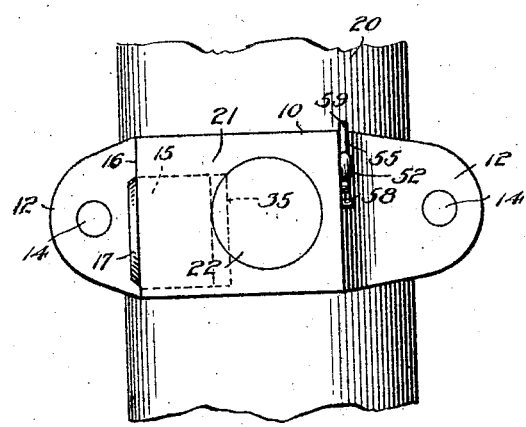
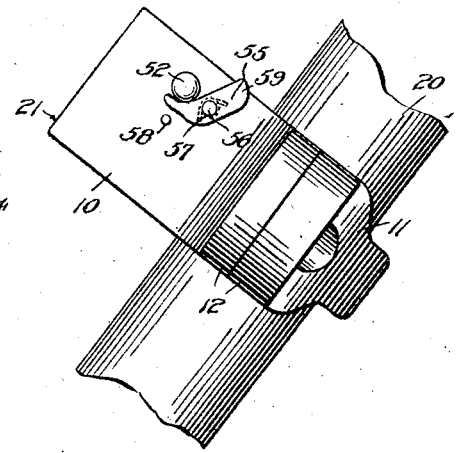
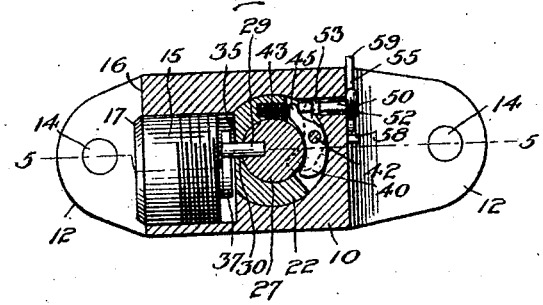
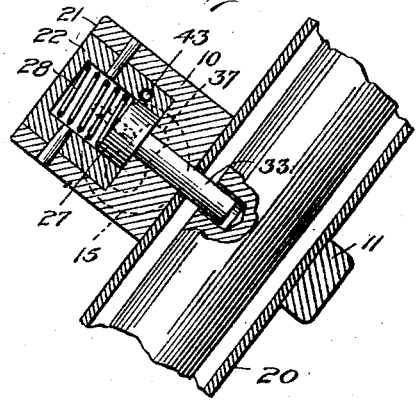
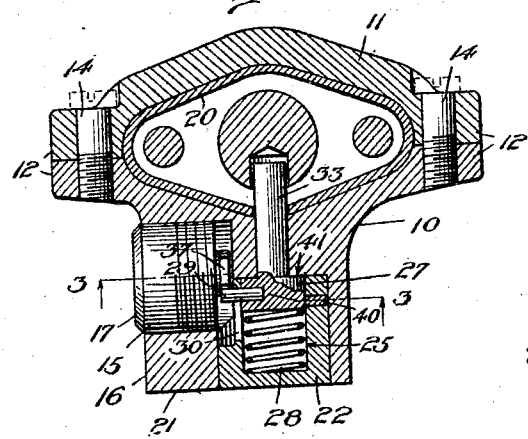
Inventor
Chas. N. Fairchild
By Church & Church
His Attorneys Patented July 13, 1926.

1,592,088

UNITED STATES PATENT OFFICE.

CHARLES N. FAIRCHILD, OF NEW YORK, N. Y., ASSIGNOR TO FAIRCHILD LOCK CORPORATION, OF THE COUNTY OF NEW CASTLE, DELAWARE.

STEERING-POST LOCK.

Application filed October 18, 1923. Serial No. 669,422.

This invention relates to locks for use on the steering post of an automobile and has for its object the provision of a simple and efficient lock having a pin to prevent movement of the steering post rod and in which accidental locking of the wheel is prevented.

A further object of the present invention is to provide a steering post lock in which the steering wheels of the automobile may be turned at an angle to the center line of the car and the device so set that the wheels will be locked upon being turned parallel to the longitudinal center line of the car, but in which the wheels will not be locked until that position is reached.

In the drawings,—

Figure 1 is a front elevation of the lock and illustrating a portion of the steering post structure.

Figure 2 is a side elevation.

Fig. 3 is section on line 3—3 of Fig. 5.

Fig. 4 is a section taken through the axes of the main shaft and locking pin.

Fig. 5 is a section on line 5—5 of Fig. 3.

The housing is composed of two sections 10 and 11 having laterally extending ears 12 which meet with no space therebetween and are held in such position by screws 14 which are hardened except at the kerfed end which is left soft in accordance with usual practice in order that it may be removed flush with the outer surface of the section 11 of the housing. The major portion of the larger member 10 of the housing is substantially cubical and is bored at one side to receive a pin plunger type lock, the end of the barrel being shown as at 15. The outer circular face of the lock barrel 15 may be flush with the wall 16 of the housing or, if the periphery of the lock barrel is beveled off as is often done and as is illustrated in Fig. 1 the edge of the cylindrical portion of the barrel may be made flush with the wall 16 and the slight conical portion 17 may extend outwardly therefrom making a slightly more pleasing construction and yet not affording hold for a wrench or other tool.

Substantially centrally of the steering post 20 the front face 21 of the housing is bored to receive a member which for convenience is hereinafter termed the cartridge and is numbered 22 on the drawings, this member being a cylinder of the same material as the rest of the housing and permanently secured thereto in any desired manner preferably by driving a pair of pins through the members 10 and 22 of the housing. The cartridge is counterbored deeply as at 25 to receive a piston 27 which is held outwardly by a spring 28 within the limits permitted by the pin 29 carried by the piston 27 and riding in a slot 30 in the cartridge. The locking pin proper, which extends into the steering post rod in the usual manner, is numbered 33 in the drawings and is integral with the piston 27. A portion of the rear or inner surface of the cartridge is removed leaving a plane face 35 to enable the lever 37 fast to the cylinder of the spring pin lock to engage readily the projecting end of the pin 29 to force it back into the end of the cartridge against the tension of the spring 28.

When the key is inserted in the lock and the cylinder revolved to cause the lock bolt lever 37 to withdraw the steering rod locking pin 33 a pawl 40 engages the outer or rear face 41 of the major diameter portion of the piston and holds it in retracted position. This pawl or catch 40 is pivoted to the cartridge as by the pivot pin 42 and is urged into piston locking position by a small coil spring 43 located in a bore in the cartridge. At the end of the pawl nearest the spring 43 there is a small projection 45 which, when the steering post locking pin 33 is moved forwardly or inwardly, projects beyond the periphery of the cartridge 22 and engages a releasing pin 50 moving the headed end 52 thereof outwardly as far as the central projection 53 on the releasing pin 50 will permit To comply with the requirements of the underwriters the releasing pin 50 is prevented from being moved to locking position by a small catch 55 pivoted as at 56 to the flat side wall of the housing and urged by a spring 57 into engagement with the head 52 or stem 50 of the releasing pin. Movement of this catch to free the releasing pin to allow it to be pushed inward is limited by a small stop lug 58 in accordance with common practice. By moving the larger end 59 of the catch 55 by hand against the tension of the spring 57 the pin 50 may be pushed inward to engage the projection 45 on the pawl 40 to release the piston and locking pin and to allow the spring 28 to push these parts into locking position or at least against the steering post rod if the wheels are set at an angle to the body. The steering post rod is bored to receive snugly the pin 33 and as soon after locking as the wheels are brought into straight ahead position the spring 28 forces the pin 33 the remainder of its journey home into the bore in the steering rod.

What I claim is:

1. In a steering post lock, a cylinder type lock having a lever on the cylinder thereof, a cartridge arranged at right angles to said lock, a piston within said cartridge, a steering rod locking pin carried by said piston, means for yieldably resisting movement of the lock lever to withdraw said pin, a pawl for engaging the piston to retain same in unlocked position, means operable from the outside of the housing to release said pawl, and means for preventing accidental movement of the last mentioned means.

2. In a steering post lock, a cylindrical cartridge having a portion of its periphery removed to form a plane surface, a plunger slidably mounted in said cartridge, a spring tending to separate the plunger and cartridge, a pin extending beyond the face of the plane surface of the cartridge, means for engaging said pin to compress said spring, and spring actuating means for yieldably holding said plunger in such position.

3. In a steering post lock, a cartridge having a central cavity and a slot leading to said cavity, a spring within said cavity, a piston slidably mounted in said cartridge and engaging said spring, a spring pressed pawl pivoted in the cartridge and movable by said pawl spring to retain the piston in spring compressing position, and a projection on said pawl extending beyond the periphery of the cartridge and outside of the slot.

4. In a steering post lock, a housing having two plane faces and having a bore extending from each plane face, a cylinder lock in one of said bores and a cartridge in the other of said bores, said cartridge having a smooth unbroken face flush with the outer face of the housing, a lever on said lock, a steering rod locking pin slidably mounted in said cartridge and engageable by the lock lever.

5. In a steering post lock, a housing, a cartridge having a recess therein terminating short of one face thereof, means for securing said cartridge in said housing with the mouth of said recess directed toward the steering rod, a spring pressed bolt within said cartridge adapted to engage said steering rod to lock same against movement, means for disengaging said bolt and rod, a pawl for holding the bolt retracted, and means for tripping said pawl.

6. In a steering post lock, a cylindrical cartridge having a central cavity and a slot leading from the cylindrical portion to said cavity, a spring within said cavity, a piston slidably mounted in the cartridge and engaging said spring, a spring pressed pawl pivoted in the cartridge and movable by said pawl spring to retain the piston in spring compressing position, a projection on said pawl extending beyond the circular periphery of the cartridge and outside of the slot, a housing surrounding said piston and closing said central cavity, means in said housing for retracting said piston, and independent means manually operable from the outside of said casing for moving said pawl about its pivot to compress the pawl spring.

7. In a steering post lock, a housing, a bolt therein, a pawl engaging said bolt to hold same in unlocked position, a member adapted to strike the pawl to release the bolt, and yieldable means barring contact of the member with the pawl.

8. The device of claim 7 in which the pawl is entirely within the housing and the barring means is located on the outside of the housing and is manually controlled.

9. The device of claim 7 in which the pawl is entirely within the housing and is spring-pressed and the means is a spring-pressed pivoted, manually operated catch.

10. The device of claim 7 in which the bolt, the pawl, and the barring means are each independently spring actuated.

CHARLES N. FAIRCHILD.